US006542477B1

(12) United States Patent
Pal et al.

(10) Patent No.: US 6,542,477 B1
(45) Date of Patent: Apr. 1, 2003

(54) DIGITALLY-TUNABLE ECHO-CANCELLING ANALOG FRONT END FOR WIRELINE COMMUNICATIONS DEVICES

(75) Inventors: Debajyoti Pal, Fremont, CA (US); Sujai Chari, Redwood City, CA (US); Christopher Hansen, Sunnyvale, CA (US); Chung-Li Lu, Sunnyvale, CA (US)

(73) Assignee: Virata Corporation, Santa Clara, CA (US)

( * ) Notice: Subject to any disclaimer, the term of this patent is extended or adjusted under 35 U.S.C. 154(b) by 0 days.

(21) Appl. No.: 09/281,903

(22) Filed: Mar. 31, 1999

(51) Int. Cl.[7] .................................................. H04B 3/20
(52) U.S. Cl. ....................................... 370/286; 370/288
(58) Field of Search ................................. 370/286–289, 370/290, 291, 310; 375/222, 229

(56) References Cited

U.S. PATENT DOCUMENTS 4,799,214 A    1/1989   Takashi 5,204,854 A    4/1993   Gregorian et al. ......... 370/32.1
5,633,863 A    5/1997   Gysel et al.

FOREIGN PATENT DOCUMENTS

WO    89 12934 A    12/1989

*Primary Examiner*—David Vincent
(74) *Attorney, Agent, or Firm*—Burns, Doane, Swecker & Mathis, L.L.P.

(57) ABSTRACT

The present invention, generally speaking, provides a digitally-tunable, echo-cancelling analog front end (AFE) for wireline digital communications. The analog front end is especially useful in a High-bit-rate Digital Subscriber Line (HDSL) or HDSL2 environment. An analog echo simulation path is provided capable of simulating echo from a wide variety of echo paths. Digitally controlled attenuators are provided in the transmission path and in the analog echo simulation path. Also provided is a digital-tunable equalizer stage. The equalizer stage is tuned to match the characteristics of the receive path. The same arrangement may be adapted for various DSL technologies, i.e., xDSL. There results an analog front end that is well-adapted to high-speed wireline communications.

18 Claims, 6 Drawing Sheets

DIGITALLY-TUNABLE ECHO-CANCELLING ANALOG FRONT END FOR WIRELINE COMMUNICATIONS DEVICES

BACKGROUND OF THE INVENTION

1. Field of the Invention

The present invention relates to signal conditioning for digital wireline communications, e.g., echo cancellation, equalization, etc.

2. State of the Art

Echo cancellation, or echo attenuation, facilitates achievement of efficient, full-duplex data communications on two-wire channels. Various echo-cancellation techniques are known. FIG. 1 shows a block diagram of a widely known prior art "adaptive hybrid" 100. Adaptive hybrid 100 is trained on the signal from the local transmitter received via port 103. This is usually done while the signal, normally received from the far end, is absent.

Filters 101 and 102 approximate the characteristics of nominal short and nominal long "near-end" echo paths, respectively. Interpolator 104 is automatically adjusted in response to the operation of adaptive algorithm 105 in an attempt to provide an echo estimate to summer 106 that closely approximates the echo. Circuit 106 subtracts the estimated echo from one output of the fixed hybrid, and this output normally includes echo plus received signal.

The prior art approach of FIG. 1, however, provides little attenuation of some echoes. This limitation arises from the fact that a substantial percentage of echo paths (even near-end echo paths) differ widely from any characteristic that is capable of being provided as an interpolation between the two filters 101 and 102.

U.S. Pat. No. 5,204,854 describes an adaptive hybrid capable of achieving substantial echo attenuation for a wider variety of echo paths. This versatility, however, is achieved at the expense of substantial complexity.

There remains a need for an analog front end (AFE) that is simple in its realization yet highly effective in its attenuation of echo from a wide variety of echo paths. The present invention addresses this need.

SUMMARY OF THE INVENTION

The present invention, generally speaking, provides a digitally-tunable, echo-cancelling analog front end (AFE) for wireline digital communications. The analog front end is especially useful in a High-bit-rate Digital Subscriber Line (HDSL) or HDSL2 environment. An analog echo simulation path is provided capable of simulating echo from a wide variety of echo paths. Digitally controlled attenuators are provided in the transmission path and in the analog echo simulation path. Also provided is a digital-tunable equalizer stage. The equalizer stage is tuned to match the characteristics of the receive path. The same arrangement may be adapted for various DSL technologies, i.e., xDSL. There results an analog front end that is well-adapted to high-speed wireline communications.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

Figure 1:
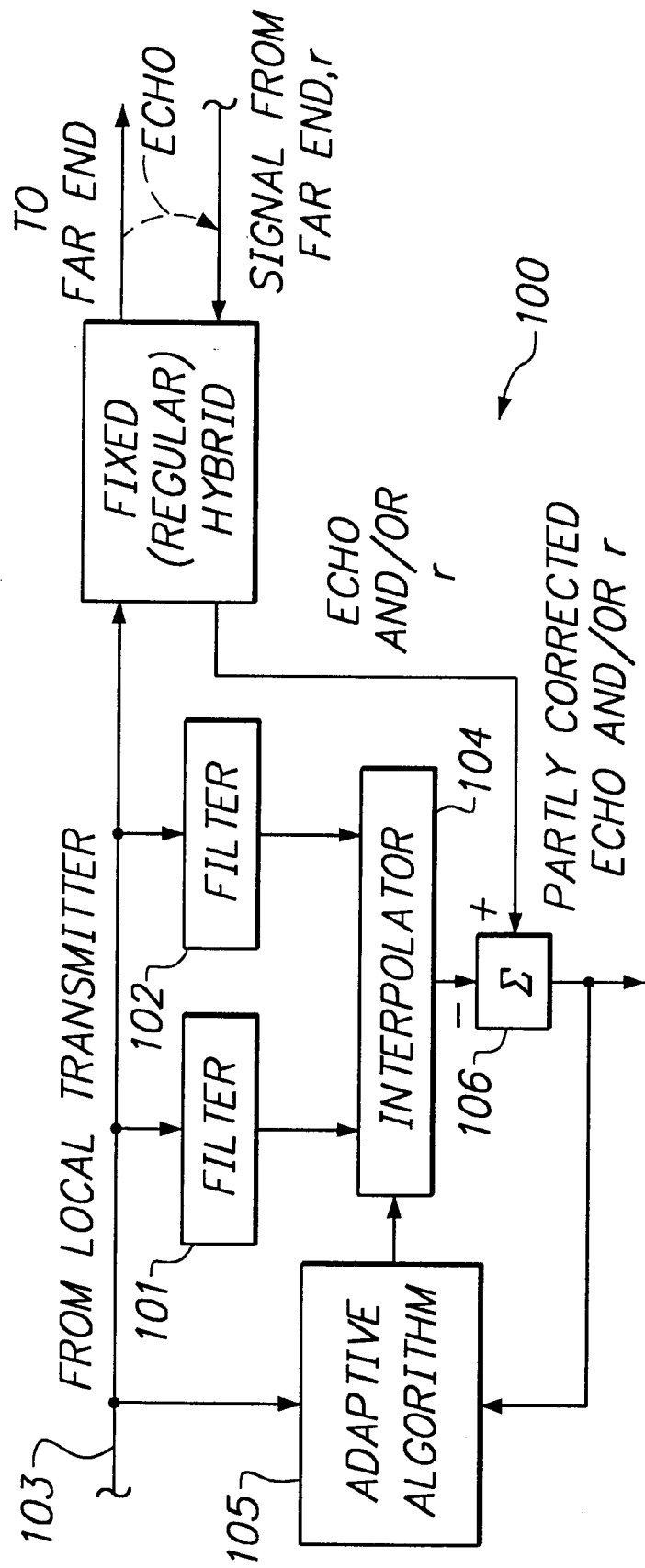
FIG. 1 is a block diagram of a typical prior art adaptive hybrid.
Figure 2:
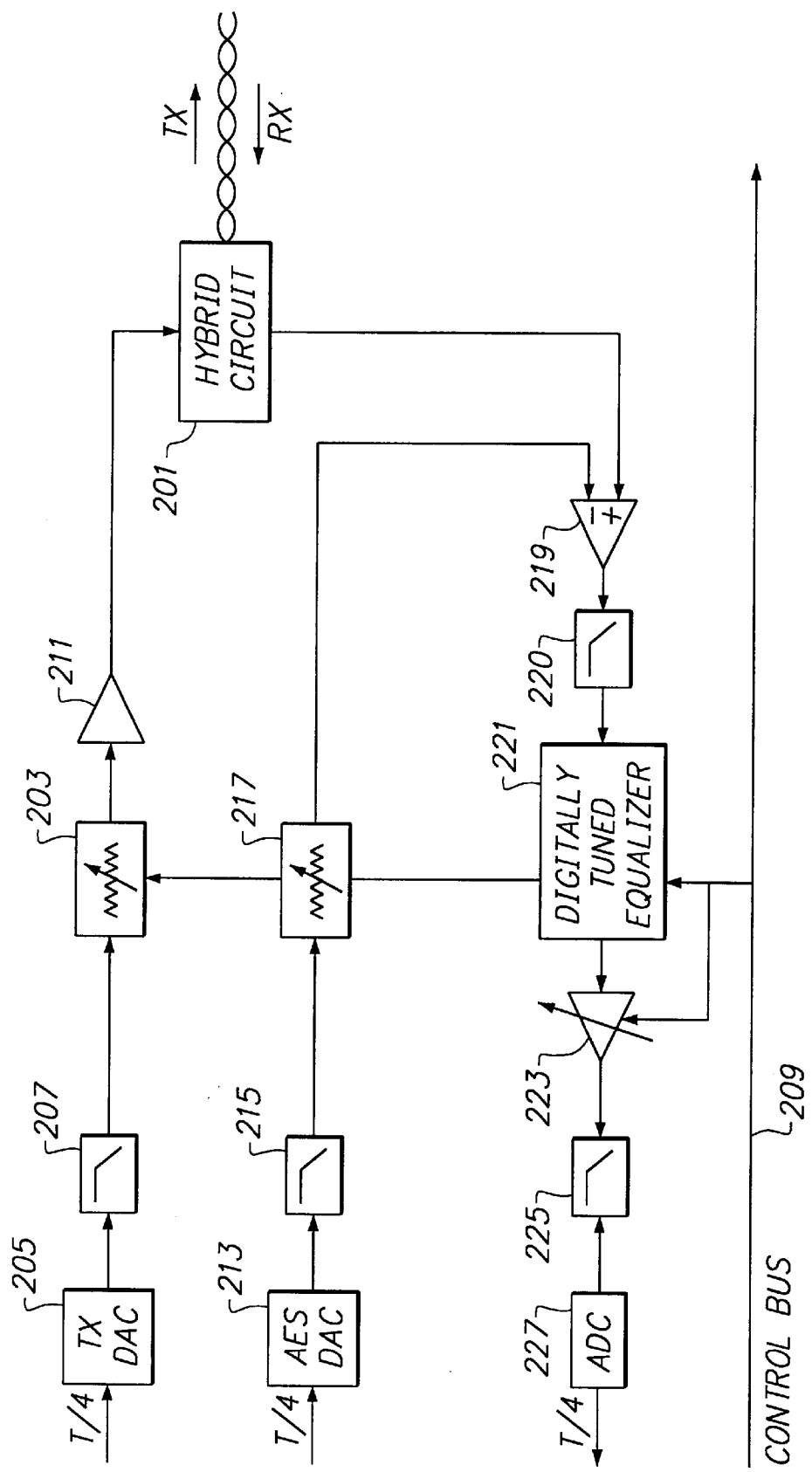
FIG. 2 is a block diagram of an AFE in accordance with an exemplary embodiment of the invention.

Referring now to FIG. 2, a block diagram is shown of an AFE in accordance with an exemplary embodiment of the invention. The AFE may be divided into a transmit side and a receive side. A hybrid 201 is shared between the transmit side and the receive side. The transmit side may in turn be divided into a transmit signal path and an analog echo synthesis path.

The transmit signal path differs from the conventional transmit signal path of an AFE in that a digitally controlled attenuator 203 is used to realize a power cutback feature. More particularly, the transmit signal path receives a digital transmission signal and converts the digital signal into an analog signal using a transmit digital to analog converter (DAC) 205. An output signal of the transmit DAC is filtered using a transmit filter 207. The transmit filter ensures that signal energy is confined to the transmission band. An output signal of the transmit filter is then selectively attenuated by the digitally controlled attenuator 203. Alternatively, the order of the transmit filter and the digitally controlled attenuator may be reversed; i.e., the digitally controlled attenuator may precede the transmit filter without affecting operation of the present invention. A suitable attenuation setting for the digitally controlled attentuator is selected by a control processor or digital signal processing engine (DSPE, not shown) and applied via a control bus 209. An output signal of the digitally controlled attenuator is then applied to a power amplifier and line driver 211, which drives the communications line through the hybrid 201.

The digitally controlled attenuator may be realized as an analog potentiometer having a digital control setting. Based on computed signal levels, the DSPE determines the appropriate scale factor for the transmit path. This setting is then communicated digitally through the control bus to the attenuator. Very fine tuning may therefore be achieved.

Digitally controlled power cutback is also invoked via the digitally controlled attenuator in the transmit path.

The analog echo synthesis (AES) path is composed of similar blocks as the transmit path. In particularly, the analog echo synthesis path receives a digital echo signal and converts the digital echo signal into an analog signal using an AES DAC 213. An output signal of the AES DAC is filtered using an AES filter 215. An output signal of the transmit filter is then selectively attenuated by a digitally controlled attenuator 217. Again, the order of the transmit filter and the digitally controlled attenuator may be reversed; i.e., the digitally controlled attenuator may precede the AES filter without affecting operation of the present invention. A suitable attenuation setting is selected by the control processor and applied via the control bus. An output signal of the digitally controlled attenuator is then applied to a summing amplifier 219 connected to the hybrid on the receive side.

In general, the attenuation setting of the digitally controlled attenuator in the AES path will be different than in the transmit path. More particularly, the digitally controlled attenuator in the AES path compensates for both the rejection level through the hybrid and the attenuation of the transmit attenuator for power cutback.

Figure 3:
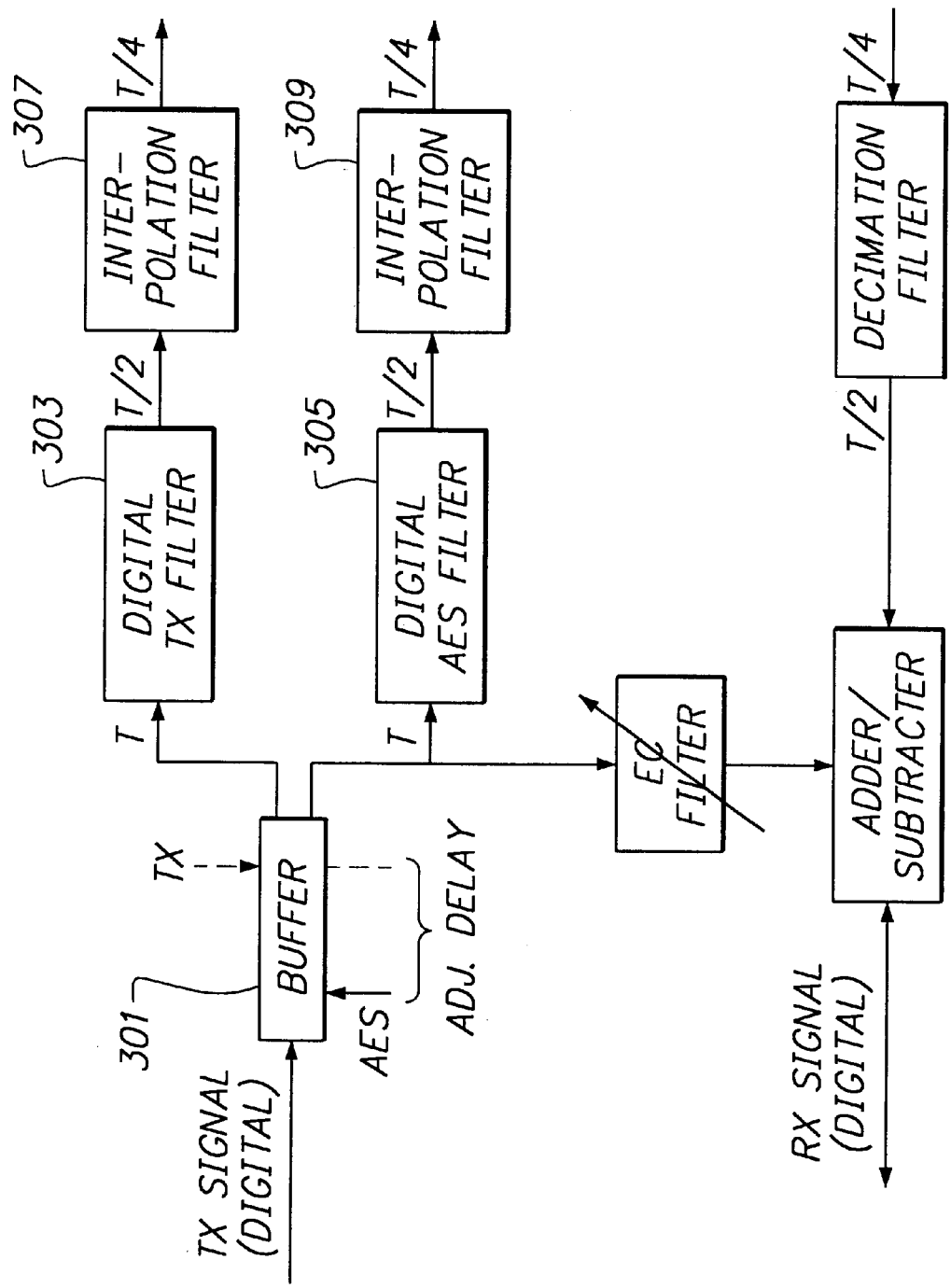
FIG. 3 is a block diagram of a digital data feed and data receiving circuit that interfaces with the AFE of FIG. 2.

The manner in which the digital echo signal is produced may be appreciated with reference to FIG. 3, showing a digital circuit that interfaces with the AFE, including a mechanism for feeding digital data to the transmit DAC and the AES DAC. A digital transmit signal is read out of a buffer 301 and applied to a digital transmit filter 303. The sample time of the digital transmit signal may be represented as T. A delayed replica of the same digital transmit signal is also applied to an adaptive digital AES filter 305. Separate Tx and AES pointers point to the current location in the buffer to be read out and applied to the digital transmit filter and to the adaptive digital AES filter, respectively. The effect of such an arrangement is the same as if the same digital transmit signal were applied to the digital transmit filter and also through an adjustable delay to the adaptive digital AES filter. The characteristics of the adaptive digital AES filter are set by the control processor through an adaptation algorithm that is run during initial training or at intervals, as desired.

The digital transmit filter and the adaptive digital AES filter are both interpolating filters that reduce the sample time to T/2 (i.e., double the sample rate). In an exemplary embodiment, these filters are followed by respective interpolation filter stages 307 and 309 that further reduce the sample time to T/4. The sample rate is therefore 4× the original sample rate. Output signals of the interpolation filter stages are applied to the transmit DAC 311 and the AES DAC 313, respectively.

The adaptive digital AES filter is trained during initialization to minimize a suitable measure of error such as mean-square error (MSE).

Note that the overall echo characteristic is simulated by two separate filters, an adaptive digital AES filter and an analog AES filter, operating in concert, and that an independent AES DAC is provided instead of using the transmit DAC. (In an exemplary embodiment, the analog AES filter and the analog transmit filter are both low-pass filters and have substantially the same characteristic.) Using an adaptive digital AES filter and an analog AES filter operating in concert enables a wide range of echo characteristics to be more easily simulated. More particularly, if the AES path were to share the transmit DAC, the AES filter would be required to simulate the echo response quite accurately, which would involve designing a very complicated analog filter. In accordance with the illustrated embodiment, the AES filter can be kept simple by placing an adaptive digital filter in front of the AES DAC.

Referring again to FIG. 2, on the receive side, the hybrid produces a receive signal that is applied to the summing amplifier, along with the AES signal. The summing amplifier subtracts the AES signal from the receive signal, thereby accomplishing echo attenuation or cancellation, and applies the resulting echo-cancelled signal to an optional pre-anti-aliasing filter 220. An output signal of the anti-aliasing filter is applied to a digitally-tunable equalizer stage 221 controlled through the control bus. An output signal of the digitally-tunable equalizer stage is applied to a digitally-tunable variable gain amplifier 223. In contrast to a conventional AGC circuit that operates automatically to raise the receive signal to a predetermined level for processing by a receive analog to digital converter (ADC), the stage is digitally controlled. It therefore functions as a digitally-tunable AGC (DT-AGC). An output signal of the DT-AGC is input through a conventional anti-aliasing filter 225 to the receive ADC 227.

Instead of a regular analog AGC, the foregoing architecture uses the DSPE to digitally compute with greater accuracy the required gain setting, which information is then sent to the DT-AGC via the control bus.

Figure 4:
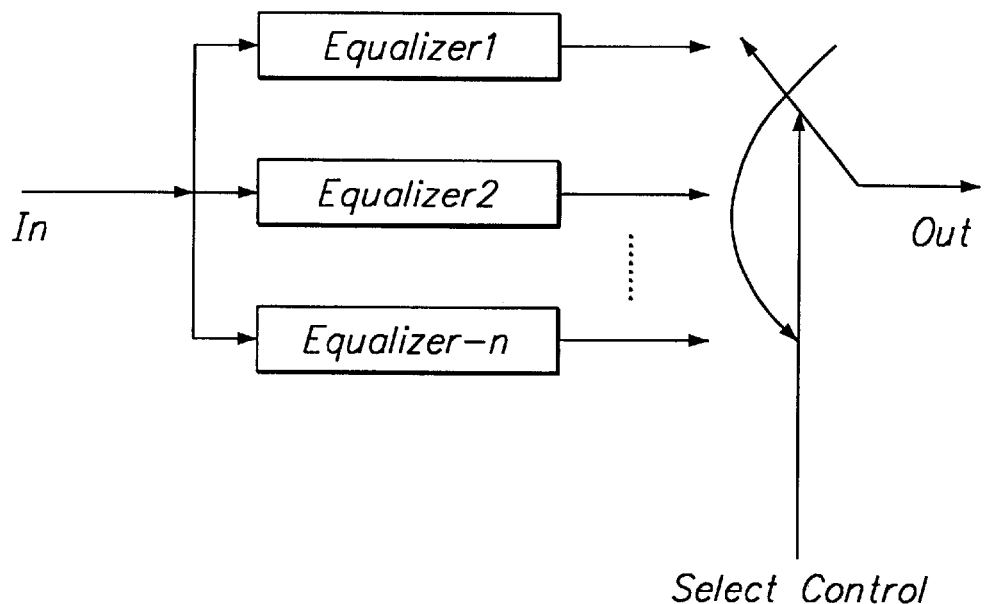
FIG. 4 is a block diagram of the digitally-tunable equalizer of FIG. 2.

Referring to FIG. 4, the digitally-tunable equalizer stage (DT-EQ) is shown in greater detail. In an exemplary embodiment, the digitally-tunable equalizer stage is realized as a bank of equalizers, each of the equalizers being tailored for different line characteristics. An input signal is applied to all of the equalizers in parallel. A switch is used to select an output signal of one of the equalizers. A suitable switch setting is determined by the control processor and a corresponding control signal is applied to the switch.

Figure 5:
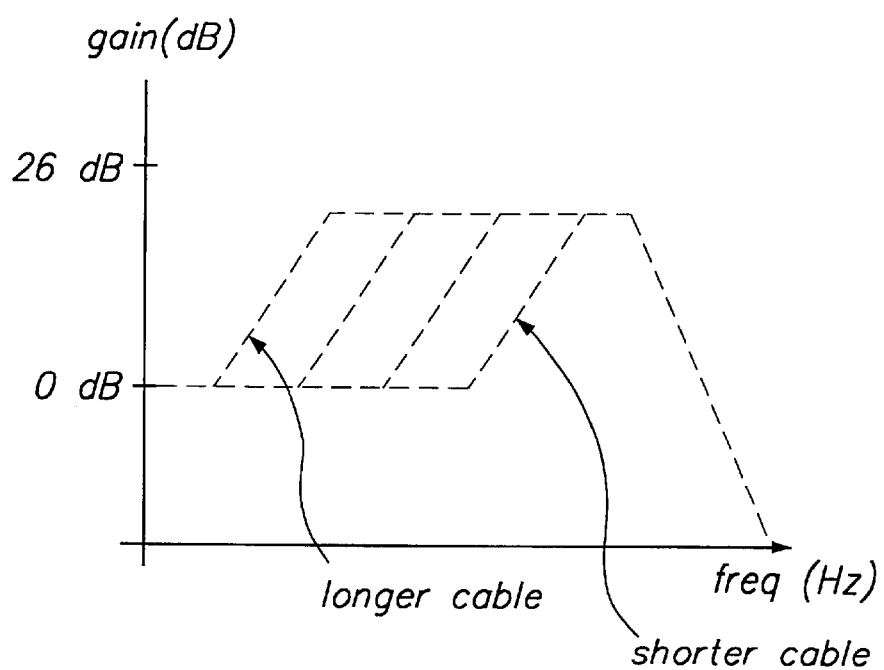
FIG. 5 is a diagram showing one suitable frequency response characteristic for the digitally-tunable equalizer stage of FIG. 2.

The purpose of having a selectable DT-EQ stage is to provide different shaped compensation characteristics for different types of loops. For long loops, the compensation characteristic is different than for short loops. Different compensation characteristics may be provided for wires of different gauges as well. In an exemplary embodiment, the frequency response of the equalizer is as shown in FIG. 5.

Referring again to FIG. 3, the digital circuitry used to interface to the receive path of the AFE will now be described. A digital output signal of the ADC is sample-rate converted by a decimation filter 315. Whereas an input signal of the decimation filter has a sample time of T/4, an output signal of the decimation signal has a sample time of T/2. This signal is applied to an adder/subtracter 317. An adaptive digital echo canceller 319 is used to cancel residual echo not cancelled by the AFE. The digital transmit signal is applied to the adaptive digital echo canceller, which produces a residual echo signal. The adder/subtracter subtracts this signal from the output signal of the decimation filter.

Figure 6:
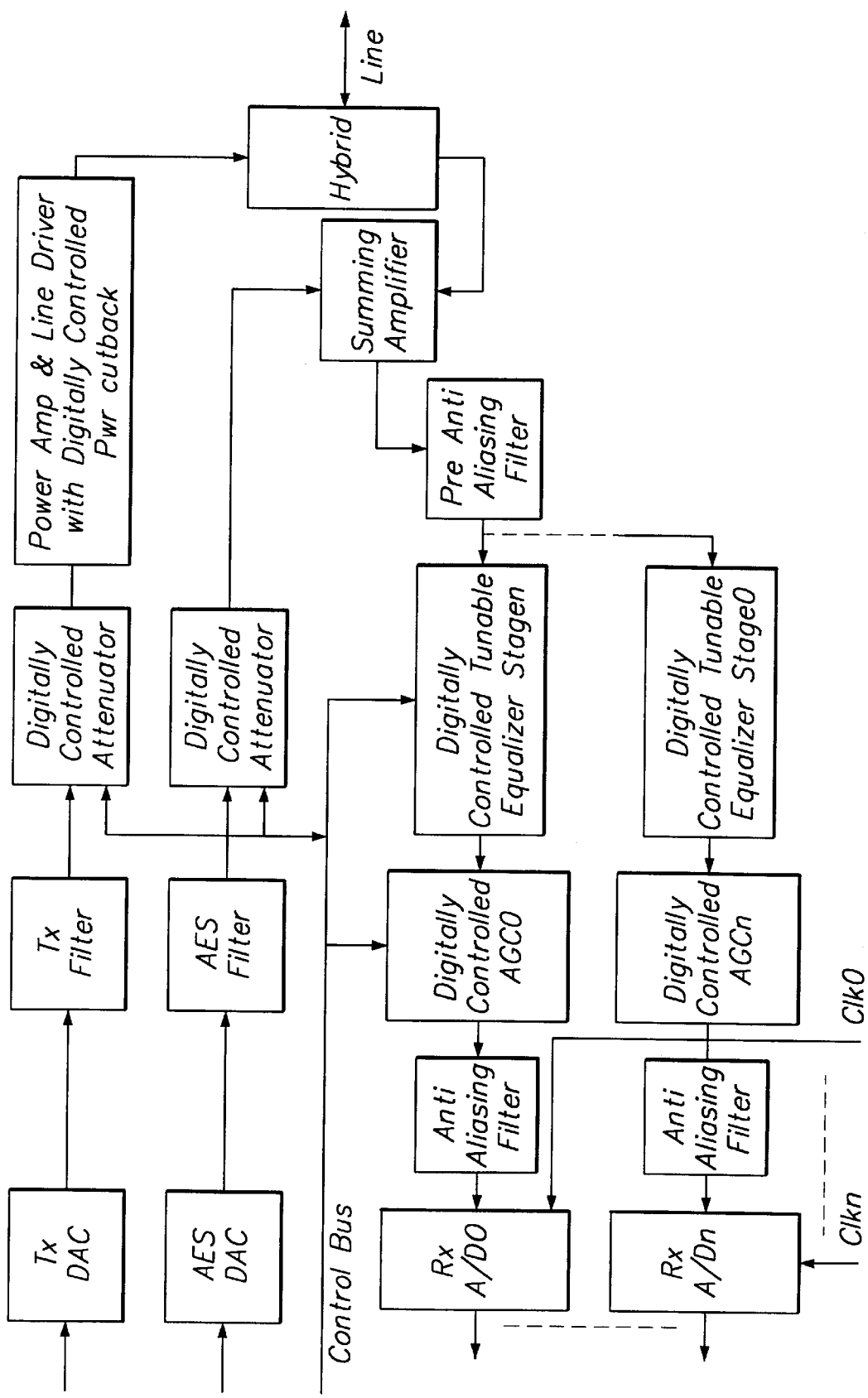
FIG. 6 is a block diagram of an AFE in accordance with another embodiment of the invention.
Figure 7:
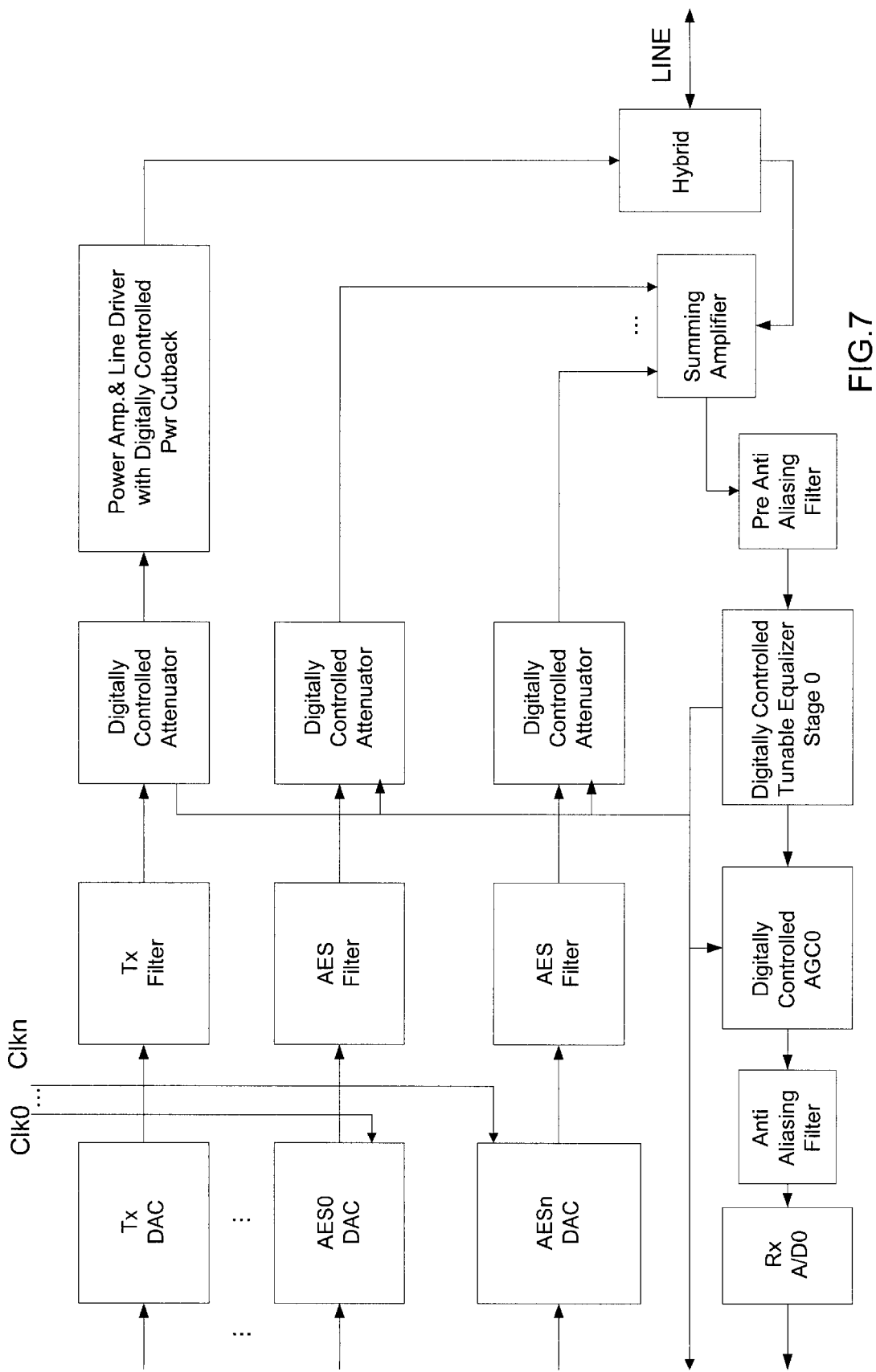
FIG. 7 is a block diagram of an AFE in accordance with still another embodiment of the invention.

Referring to FIG. 6, a block diagram is shown of an AFE in accordance with an alternative embodiment of the invention. The AFE of FIG. 6 differs from that of FIG. 2 in the details of the receive side. In particular, multiple parallel receive paths are provided, identical in construction but individually controlled. Multiple ADCs are controlled in accordance with different phases of a multi-phase clock. The output signals of the ADCs are summed together to form a resultant output signal. The ADCs may be of lower resolution, speed and linearity than if a single ADC is used. The receive path of FIG. 6 and the receive path of FIG. 2 are functionally equivalent. A corresponding technique may be used on the transmit side, i.e., providing plural AES paths with plural DACs of lower accuracy, speed and linearity than is required if a single DAC is used. Such an embodiment is illustrated in FIG. 7.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. An analog front end for use in a communications system comprising:

a transmit signal path unit adapted to produce a transmit signal provided to the communication hybrid, the transmit path unit including a first digital to analog converter and a first digitally-tunable analog attenuator;

at least one echo cancellation signal path unit producing an echo cancellation signal, the echo cancellation path unit including a second digital to analog converter and a second digitally-tunable analog attenuator; and means for summing the echo cancellation signal together with a received signal from the communications hybrid to produce an echo-canceled receive signal.

2. The analog front end of claim 1, comprising multiple echo cancellation signal path units.

3. The analog front end of claim 2, wherein each echo cancellation signal path unit includes an analog filter and a digital to analog converter.

4. The analog front end of claim 1, further comprising a receive path unit comprising a digitally-controlled analog equalizer coupled to the echo-canceled receive signal and producing an equalized receive signal.

5. The analog front end of claim 4, wherein the digitally controlled analog equalizer comprises multiple analog equalizer stages corresponding to multiple different line characteristics, wherein a control signal selects one of the equalizer stages.

6. The analog front end of claim 1, wherein the at least one echo cancellation path includes an analog filter.

7. The analog front end of claim 1, wherein the first and second digitally-tunable analog attenuators are set at different levels.

8. An analog front end for use in a communications system comprising:

a transmit signal path unit adapted to produce a transmit signal provided to the communication hybrid, the transmit path unit including a first digital to analog converter;

at least one echo cancellation signal path unit producing an echo cancellation signal, the echo cancellation path unit including a second digital to analog converter;

means for summing the echo cancellation signal together with a received signal from the communications hybrid to produce an echo-canceled receive signal; and a receive path unit comprising a digitally-controlled analog equalizer coupled to the echo-canceled receive signal and producing an equalized receive signal.

9. The analog front end of claim 8, comprising multiple echo cancellation signal path units.

10. The analog front end of claim 9, wherein each echo cancellation signal path unit includes an analog filter and a digital to analog converter.

11. The analog front end of claim 8, wherein the digitally-controlled analog equalizer comprises multiple analog equalizer stages corresponding to multiple different line characteristics, wherein a control signal selects one of the analog equalizer stages.

12. The analog front end of claim 8, wherein the at least one echo cancellation signal path unit includes a digitally-tunable analog attenuator.

13. A communication unit comprising:

a digitally-controllable analog front end including a communication hybrid, a transmit signal path unit adapted to produce a transmit signal to the communication hybrid, the transmit signal path unit including a first digital to analog converter, at least one echo cancellation signal path unit producing an echo cancellation signal, the echo cancellation path unit including a second digital to analog converter, and means for summing the echo cancellation signal together with a received signal from the communications hybrid to produce an echo-canceled receive signal; and a digital unit interfacing with the digitally-controllable analog front end, the digital unit including a transmit signal portion providing a digital transmit signal to the first digital to analog converter, and an echo synthesis signal portion providing a digital echo synthesis signal to the second digital to analog converter.

14. The communication unit of claim 13, wherein the echo synthesis signal portion includes a adaptive digital filter and the echo cancellation path unit includes an analog filter.

15. The communication unit of claim 13, comprising multiple echo cancellation signal path units in the digitally-controllable analog front end.

16. The communication unit of claim 13, further comprising a receive path unit in the digitally-controlled analog front end comprising a digitally-controlled analog equalizer coupled to the echo-canceled receive signal and producing an equalized receive signal.

17. The communication unit of claim 16 wherein the digitally controlled analog equalizer comprises multiple analog equalizer stages corresponding to multiple different line characteristics, and wherein a control signal selects one of the equalizer stages.

18. The communication unit of claim 13, wherein the echo cancellation path unit includes a digitally-controllable analog attenuator.

* * * * *